Aug. 6, 1929.  F. UNGERER  1,723,098
METHOD AND APPARATUS FOR STRAIGHTENING PLATES
Filed June 13, 1928  2 Sheets-Sheet 1
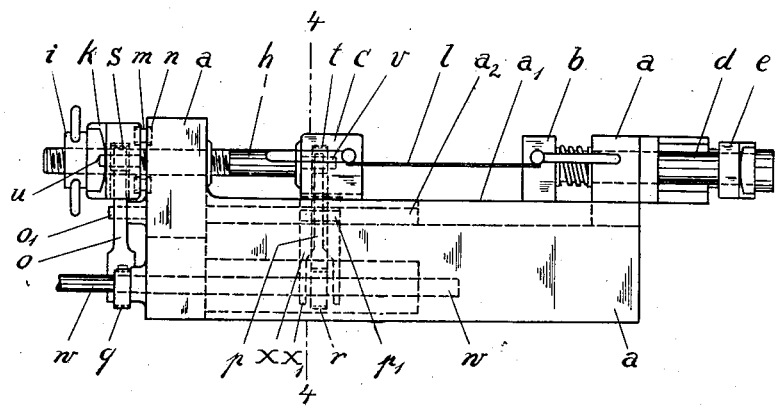
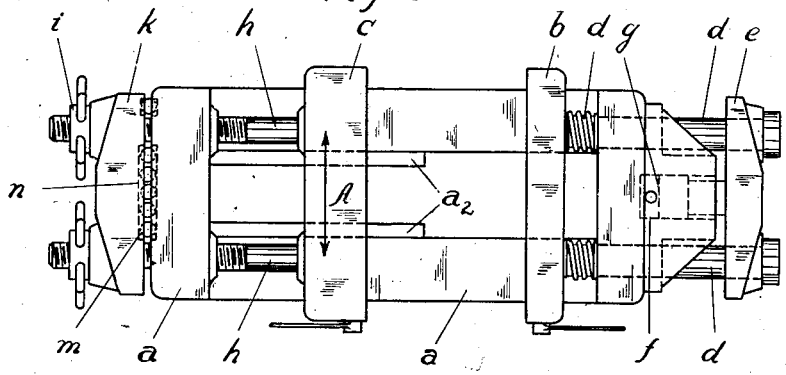
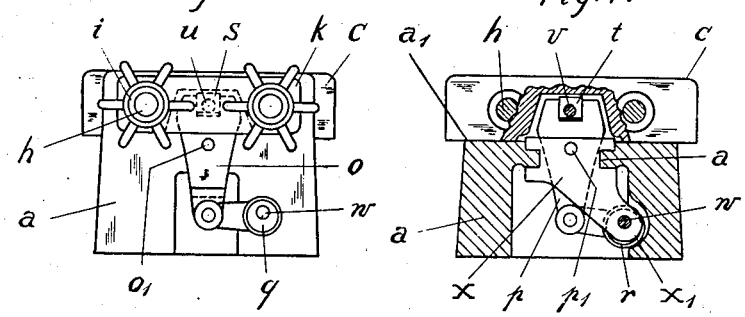

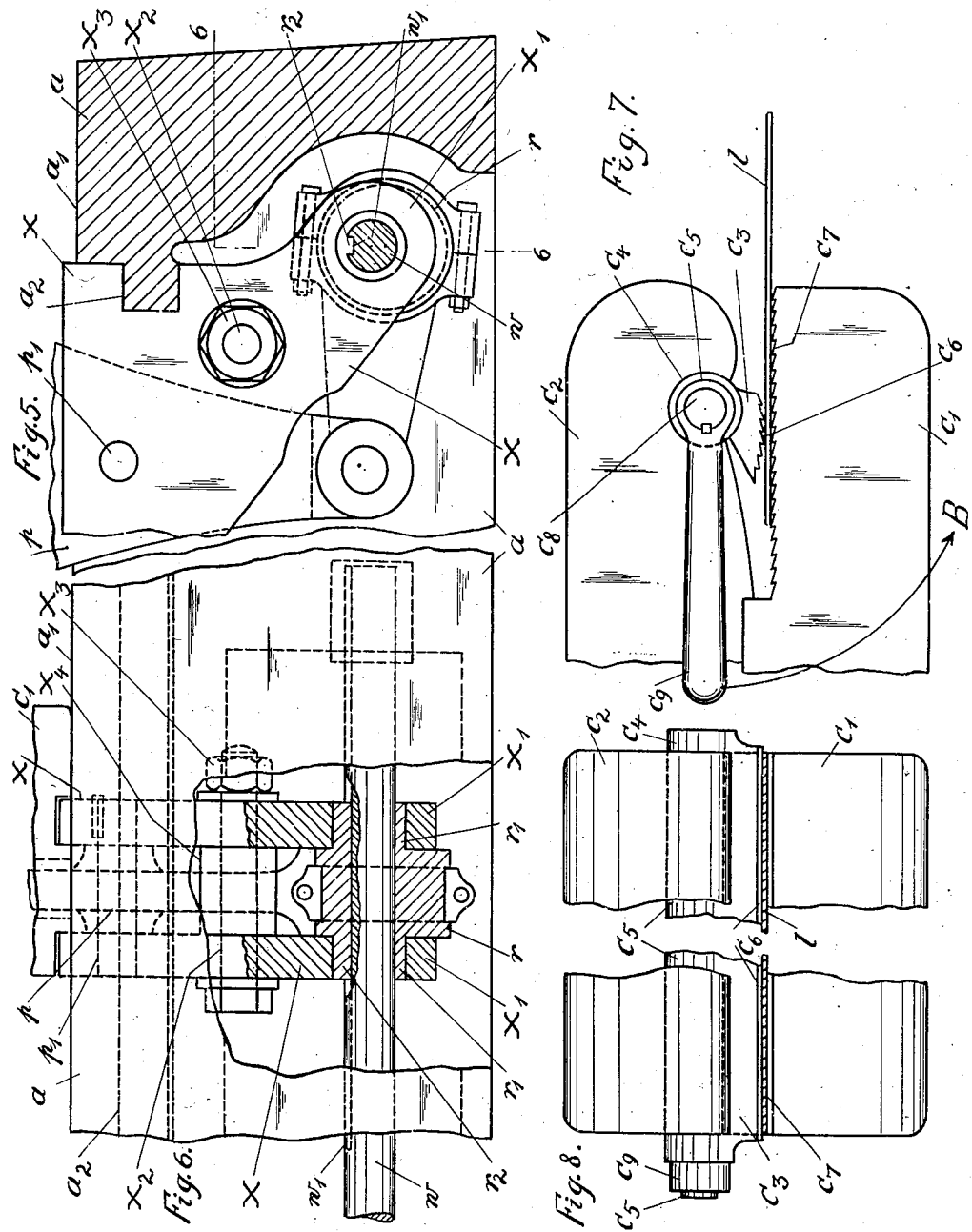

Patented Aug. 6, 1929.

1,723,098

UNITED STATES PATENT OFFICE.

FRITZ UNGERER, OF PFORZHEIM, GERMANY.

METHOD AND APPARATUS FOR STRAIGHTENING PLATES.

Application filed June 13, 1928, Serial No. 285,072, and in Germany May 31, 1927.

This invention relates to a method and apparatus for straightening sheet metal plates.

It has become known to straighten plates by stretching. With this object in view two opposite edges of the sheet-metal plate are clamped in the jaws of a plate stretching machine, the plate being then exposed to considerable tensile forces which strain up to the strain limit of the material the cross-section of some of the plate-sections to be stretched.

By this method perfect straightening results are seldom obtained, specially with thinner and harder plates.

It has been found that a very good straightening takes place, when the sheet-metal-plate stretched under static pull, i. e. statically strained, is submitted to an additional strain of a dynamic kind, for example by means of pulling forces.

The new method can be carried out, for example, so that the plate submitted to pull in the stretching machine is shaken from one clamping point or from both clamping points in the plane of the plate transversely to the stretching direction, the distance between the clamping jaws remaining constant, said jaws carrying out only a vibrating movement in the plane of the plate the one with regard to the other. The sudden pulls on the plate produced by these shaking movements exert probably a kind of contacting effect, i. e. give to the molecules, which up to then were still at rest notwithstanding the strong pull, the impetus to flow into the position of equal strain.

The shaking movement, which for many kinds of sheet metal need be only very slight, can be produced in various manners. In order not to make the construction of the stretching device very complicated, preferably only one of the two clamping jaws is arranged so that it can move in transverse direction, this clamping jaw being connected to a suitable shaking device. Both clamping jaws might however carry out oppositely directed shaking movements.

To explain the method a stretching device having a shaking arrangement at one end is illustrated, by way of example, in the accompanying drawing, in which:

Fig. 1 is a front-elevation.
Fig. 2 a top-plan-view.
Fig. 3 a side-elevation and
Fig. 4 a section on line 4—4 of Fig. 1.
Fig. 5 shows the eccentric driving mechanism for the clamping element.
Fig. 6 is a cross section on line 6—6 of Fig. 5.
Fig. 7 shows the clamping jaw in side elevation and
Fig. 8 is a part end view of the clamping jaw.

The apparatus consists essentially of two main elements, the stretching device of known type and the shaking mechanism. Both devices are arranged in the machine-frame $a$ which forms a slide $a'$ for the clamping jaws $b$ and $c$. The clamping jaw $b$ is at the same time the pulling jaw, and it is therefore connected by pull-rods $d$ with a yoke $e$ onto which acts the piston $g$, arranged in the pressure-cylinder $f$. The clamping jaw $c$ forms at the same time an adjustable-jaw and a shaking-jaw. It can be adjusted by means of screw-spindles $h$ and adjusting nuts $i$ to the length of the sheet-metal-plate $l$ to be straightened. Its shaking movement takes place so that it is moved to and fro, together with the screw-spindles $h$ and the yoke $k$ against which the adjusting nuts $i$ press, in the direction of the double arrow-line A (Fig. 2), i. e. perpendicularly to the straightening or stretching pull.

With this object in view the yoke $k$ is mounted with regard to the machine-frame $a$ on rollers $m$ engaging with cavities $n$ of the machine-frame so that said yoke can be shifted on the machine-frame $a$ transversely to the stretching direction.

The clamping jaw $c$ is driven as well as the yoke $k$ by the shaking mechanism, which consists essentially of two links $o$ and $p$, mounted on the axle-journals $o'$ and $p'$ (Fig. 1) and to which, by two eccentrics $q$ and $r$, an oscillating movement is communicated.

A bolt $u$ is mounted in a bore of the yoke $k$ and bridges the recess of the yoke $k$ in which the rocking lever $o$ engages from below. A bolt $v$ is fixed to the shaking jaw $c$ and bridges the recess of the shaking jaw $c$ in which the rocking lever engages from below.

These blocks $s$ and $t$ serve for transmitting the oscillating movement of the rocking levers $o$ and $p$ to the bolts $u$ and $v$, so that the movement of these latter which are rigidly connected with the yoke $k$ and the shaking jaw $c$ is in a straight line. The blocks $s$ and $t$ have a bore through which the bolts $u$ and $v$ pass freely. Further the blocks $s$ and $t$ project slidably between the fork arms of the rocking levers $o$ and $p$, consequently it is possible for the blocks $s$ and $t$ to perform a slight oscillating movement around the stationary bolts $u$ and $v$ and at the same time a slight displacement between the fork arms of the levers $o$ and $p$. These possibilities of movement of the blocks $s$ and $t$ in relation to the bolts $u$ and $v$ and the forked arms of the levers $o$ and $p$ are essential in order to convert the oscillating movement of these latter into a reciprocating movement of the yoke $k$ and of the shaking jaws $c$. The oscillating movement of the rocking levers $o$ and $p$ is transmitted by the blocks $s$, $t$ respectively and by the bolts $u$, $v$ respectively onto the yoke $k$ and through the same onto the shaking jaws $c$. The eccentrics $q$ and $r$ are driven by a common shaft $w$, journalled in the machine-frame $a$.

The eccentric $r$ is secured against rotation on the shaft $w$ but is shiftable in longitudinal direction so that it can follow the adjusting movement of the shaking jaw $c$ when it is brought into the proper distance from the clamping jaw $b$ according to the length of the sheet metal plate $l$.

The construction of the mechanisms which produce the shaking movement is as follows:—

The clamping jaw $c$ is first shaken in the direction A (Fig. 2), however the jaw $c$ is connected with screw-spindles $h$ for the purpose of adjustment at the correct distance, these screw-spindles $h$ as also the yoke $k$ and the adjusting nuts $i$ must follow the shaking movement in the direction A. The screw-spindles $h$ therefore do not pass through tight fitting holes in the machine frame $a$, but through holes which are large enough not to hinder in any way the mutual shaking movement of the clamping jaw $c$ of the screw-spindles $h$, of the yoke $k$ and of the nuts $i$ (Fig. 2). For shaking this whole system of machine parts the shaking drive is only effected at two points of this system, namely, firstly, on the yoke $k$ which never changes its distance from the clamping jaw $b$, and on the clamping jaw $c$ the distance of which from the clamping jaw $b$ must be changed by turning the nuts $i$ according to the length of the sheet metal-plate $l$. Seeing that the clamping jaw $b$ does never change its relative position it is not necessary that the eccentric $q$, which effects the shaking drive of the yoke $k$, be slidable on the driving shaft $w$ but it is keyed thereto in known manner. On the other hand however the eccentric $r$ which effects the shaking drive of the clamping jaw $b$ must be slidable on the shaft $w$ if the clamping jaw $c$ is adjusted in relation to the clamping jaw $b$ by turning the nuts $i$. The connection of the eccentric $r$ with the shaft $w$ must be such that it follows the rotating movement of the shaft $w$ and yet is longitudinally slidable on this shaft $w$.

Figs. 5 and 6 show the means for effecting these movements.

The eccentric $r$ sits on the shaft $w$ and has two concentric journals $r'$ by means of which it is rotatably mounted in the supporting bearings $x'$. These bearings $x'$ thus form at the same time a bearing for the shaft $w$ which is provided with a longitudinal groove $w'$. A projection $r^2$ in the bore of the eccentric $r$ engages in this longitudinal groove $w'$. The eccentric $r$ may be shifted along the shaft $w$ together with the supporting bearings $x'$ yet is compelled to follow the rotary movements of said shaft $w$. The carriage $x$ formed by the supporting bearings $x'$ consists of two flanged parts connected together at suitable points e. g. by means of screw-bolts $x^2$ and nuts $x^3$, and held at a distance apart by distance sleeves $x^3$. In order that the element of the shaking device coordinated to the shaking jaw $c$ can follow the adjusting movements of the shaking jaw $c$, produced by the adjusting nuts $i$, the link $p$ is mounted in a carriage $x$, shiftably suspended in guides $a^2$ of the machine-frame $a$ and forming at the same time a supporting bracket $x'$ for that portion of the driving shaft $w$ which actually carries the eccentric $r$.

The straightening is carried out in the following manner:

The distance between the clamping jaws $b$ and $c$ is adjusted according to the length of the sheet metal-plate $l$, whereupon this plate is clamped in the mouths of the jaws $b$ and $c$ with the aid of commonly used clamping means. The clamping jaw $c$ is for example composed of a lower part $c'$ and an upper part $c^2$. A locking member comprising a cylindrical rear part $c^5$ and a serrated front portion $c^6$ eccentric to the axis of the cylindrical rear portion $c^5$, is oscillatably mounted in a recess $c^4$ in the upper part $c^2$ of the jaw $c$, so that if the jaw $c$ is moved in the direction of the arrow B (Fig. 7) the serrated portion $c^6$ will approach the serrated surface $c^7$ of the lower part $c'$. A handle $c^9$ is keyed to the reduced end $c^8$ of the rear portion $c^5$, and serves to open or close the jaw formed between the pressing surfaces $c^6$ and $c^7$ according to the direction of turning. The more the sheet metal-plate $l$ is subjected to pull, the tighter will the eccentric pressure surface $c^6$ press against the end of the sheet metal-plate, thus ensuring a secure holding of the plate. Needless to say other suitable means of clamping the plate may be used. Hydraulic pressure is then applied on the piston $g$ and increased, in observing a pressure-gauge, until the tensile-stress required for straightening the plate has been attained. At this moment the shaft $w$ is connected to a source of power, which communicates a rapid rotating movement to said shaft, this rotating movement being transmitted by the rapidly oscillating shaking jaw $c$ as shaking movement onto the plate $l$. This shaking brings the molecules of the material of the sheet metal plate which are still in the static state to flow into the position of equal straining and compensates consequently the tensions completely, so that the plate removed from the apparatus is straightened so as to extend in a single plane.

I claim:—

1. A method for straightening plates consisting in submitting the sheet metal plate to a static straightening pull, i. e., making it statically strained, and then subjecting the plate to an additional strain while so statically strained by shaking the plate to produce pulls acting in the plane of the plate.

2. A method as specified in claim 1, in which the pulls exerted on the plates are produced by shaking the same from one clamping point.

3. A method as specified in claim 1, in which the pulls exerted on the plates are produced by shaking the same from one clamping point in the plane of the plate and transversely to the stretching direction.

4. A machine for carrying out the method described, comprising a machine frame, a stationary clamping jaw on said frame, an adjustable clamping jaw on the frame, an adjusting mechanism for said adjustable clamping jaw consisting of screw-spindles and adjusting nuts associated therewith, a yoke on said machine-frame adapted to be adjusted transversely to the direction of movement of said adjustable clamping jaw and supporting said adjustable clamping jaw, and means for communicating a shaking movement to said yoke to be transmitted to said adjustable jaw and its adjusting mechanism.

5. In a machine as specified in claim 4 for carrying out the method described, in combination with the machine frame, the shaking mechanism consisting of a link, a carriage carrying said link and mounted in said machine-frame shiftable in the direction of movement of the adjustable jaw, and an eccentric for communicating to said link a reciprocating oscillating movement.

In testimony whereof I affix my signature.

FRITZ UNGERER.